350-373 SR

XR 3,732,549

United States Patent [11] 3,732,549

Barkely [45] May 8, 1973

[54] PROCESS AND APPARATUS FOR CONTROL OF DOMAIN WALLS IN THE FERROELASTIC-FERROELECTRIC CRYSTALS

[75] Inventor: John R. Barkely, Wilmington, Del.

[73] Assignee: E. I. du Pont de Nemours and Company, Wilmington, Del.

[22] Filed: May 8, 1972

[21] Appl. No.: 251,055

Related U.S. Application Data

[63] Continuation-in-part of Ser. No. 112,733, Feb. 4, 1971, abandoned.

[52] U.S. Cl. ....................340/173.2, 340/173 R
[51] Int. Cl. ....................G11c 11/22
[58] Field of Search ....................340/173 MS, 173.2

[56] References Cited

UNITED STATES PATENTS

| | | | |
|---|---|---|---|
| 3,559,185 | 1/1971 | Burns | 340/173.2 |
| 3,564,515 | 2/1971 | Gratian | 340/173 MS |
| 3,602,904 | 8/1971 | Cummings | 340/173.2 |
| 3,614,754 | 10/1971 | Cummings | 340/173.2 |
| 3,701,122 | 10/1972 | Geusic | 340/173.2 |

*Primary Examiner*—Terrell W. Fears
*Attorney*—D. R. J. Boyd

[57] ABSTRACT

An improved multistable element including a coupled ferroelectric/ferroelastic single crystal exhibiting uniaxial electric polarization, means to confine the domain walls to a preselected switching region of the crystal, means to control the movement of domain walls within the switching region including electrode means consisting of at least two electrodes on opposite faces of the crystal and an electric circuit between the electrodes to control the flow of charge between the electrodes and thereby control movement of the domain walls, optionally cooperating with means to apply mechanical stress to the crystal to move the domain walls, means to inhibit the nucleation of spurious domain walls within the crystal, and optionally means for the controlled nucleation of domain walls in the switching region. In combination with means for detecting the position of the domain wall the multistable element provides a multistable information processing apparatus and process.

34 Claims, 18 Drawing Figures

FIG. 8a
FIG. 8b
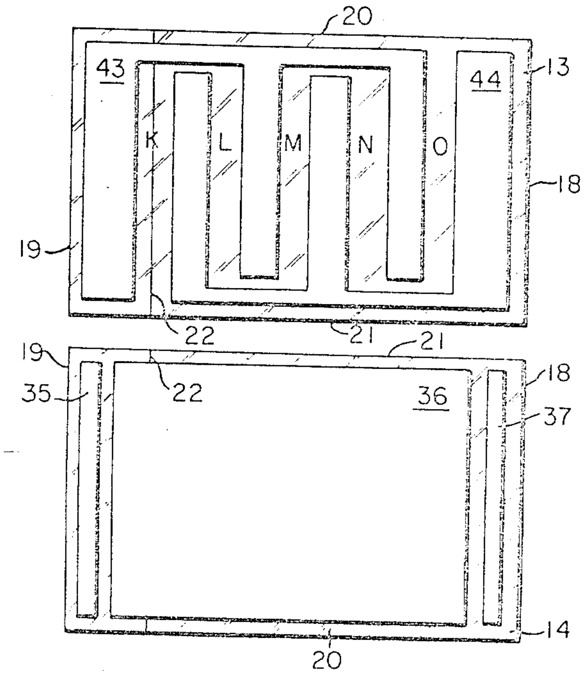
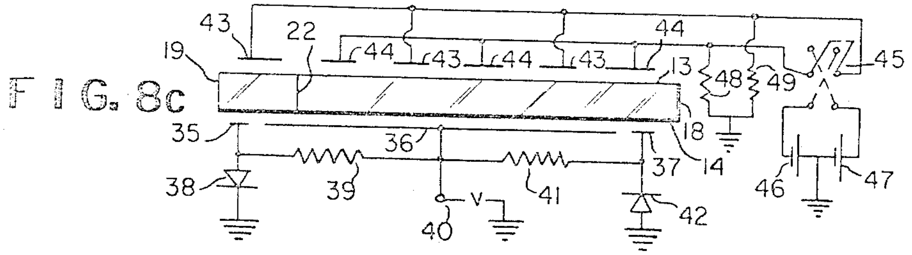
FIG. 8c
FIG. 9
FIG. 10
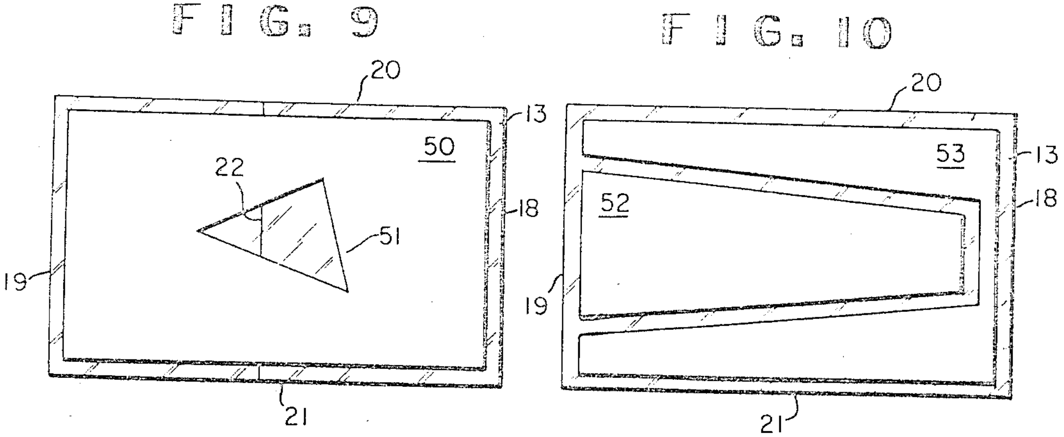

PROCESS AND APPARATUS FOR CONTROL OF DOMAIN WALLS IN THE FERROELASTIC-FERROELECTRIC CRYSTALS

RELATED APPLICATIONS

This application is a continuation-in-part of my application, Ser. No. 112,733, filed Feb. 4, 1971 and now abandoned.

BACKGROUND OF THE INVENTION

This invention relates to information processing arrangements. More particularly, it relates to multistable information storage elements and methods for their use in such arrangements, specifically those employing ferroelectric/ferroelastic single crystals as the active element.

A crystal is said to be ferroelectric if it exhibits a spontaneous switchable electric dipole moment. In the absence of an externally applied electric field, the electric polarization, corresponding to the dipole moment, can have two or more orientations and can be shifted from one orientation, or state, to another by the external application of an electric field.

By analogy, a crystal is said to be ferroelastic if it exhibits a spontaneous switchable mechanical strain. In the absence of an externally applied mechanical stress, the mechanical strain can have two or more configurations, and can be shifted from one configuration to another by external application of a mechanical stress. In a limited class of materials, the two effects, ferroelectricity and ferroelasticity, are coupled so that the two or more stable states of the crystal, each characterized by a definite orientation of electric polarization and a definite mechanical strain configuration, are possible.

The terms "ferroelectric" and "ferroelastic" arise by analogy with ferromagnetism. Like ferromagnetic materials, ferroelectric crystals exhibit a hysteresis loop, except that the loop occurs on a plot of electric polarization versus electric field, and display a transition temperature, $T_c$, analogous to the ferromagnetic Curie temperature, above which the spontaneous dipole moment, and indeed ferroelectric behavior, disappear. Likewise, ferroelastic materials display a hysteresis loop on a plot of mechanical stress versus mechanical strain, and a transition temperature. When ferroelectricity and ferroelasticity are coupled in a single material, a hysteresis loop is displayed on a plot of electric polarization and associated mechanical strain versus electric field and associated mechanical stress, and both spontaneous polarization and spontaneous strain disappear at the same critical temperature. Such a material can be switched among states, each characterized by a specific electric polarization and mechanical strain, by external application of either an electric field or a mechanical stress, or both.

The region, within a single ferroelectric crystal, in which the spontaneous polarization vector is everywhere oriented in essentially the same direction, is called a domain. There is, generally, more than one domain within a crystal, and the interface between domains is called a domain wall. Application of an electric field having a component in an allowed direction of polarization can cause nucleation of and/or growth of ferroelectric domains having that particular polarization direction, with consequent formation and movement of the associated domain walls. The analogous situation exists in ferroelastic material, where the domain wall is effectively a twin boundary. In coupled ferroelectric/ferroelastic materials, each ferroelectric domain is associated and coextensive with a ferroelastic domain, and the size and location of a particular domain (and thus the position and motion of a domain wall) can be controlled by either electrical or mechanical means, or by both means simultaneously.

The presence or absence of a domain wall at a particular location within the crystal constitutes a "bit" of information. The ability to store and electrically or mechanically control the movement of the domain wall in these crystals has led to some speculation concerning their usefulness in information processing arrangements. Because of the difference in the optical properties of the two strain states, or domains, in one such crystal, $\beta'$-gadolinium molybdate, for example, its usefulness as a bistable element, or more specifically, as a light switch has been recognized and demonstrated. See, for example, G. Burns, U. S. Pat. No. 3,559,185 which describes how the reversible birefringence of gadolinium molybdate type materials can be used as a bistable optical switch. Generally, in such an arrangement, two surfaces of the crystal, those cut parallel to the {001} crystal planes are completely electroded by evaporating an electrical conductor such as aluminum on to the surfaces of the crystal, and then an electric field, of sufficient strength to nucleate a domain, is generated by applying a voltage across the electrodes. Continued application of the voltage causes the domain to grown, and as it grows, the entire crystal is switched to one state.

The domain formed will have certain optical properties. Under ideal conditions, reversing the polarity of the electric field will reverse the direction of motion of the domain wall and switch the crystal to another state having different optical properties. The change from one state to another affects the action of the crystal on polarized light incident on the {001} surfaces of the crystal; hence the crystal's usefulness as a light switch. There is a high probability, however, that reversing the electric field applied to such a device will cause the crystal to fracture rather than to switch to a new state. While it has been suggested by S. E. Cummins in his article on "Electrical, Optical and Mechanical Behavior of Ferroelectric $Gd_2(MoO_4)_3$" in Ferroelectrics 1, 11, 1970, that such fracturing can be prevented by techniques of mechanical constraint or partial electroding of the crystal, no specific, satisfactory, embodiment of either of these techniques have been recorded.

Subject as they are to fracture, the usefulness of the device discussed above in information processing arrangements is severly limited. Furthermore, they are simple on-off devices in which the entire crystal is switched periodically from one state to another. Though useful, as a binary element in a logic circuit, for example, such devices do not make efficient use of the crystal. For example, it is well known that the size of a particular domain can be controlled by the electric field applied to the crystal, so that a true multistable device, based on the location of a domain wall within the crystal, could be constructed if some accurate method for controlling the motion and position of the domain walls could be devised. Merely controlling the strength and duration of the uniform electric field applied to the crystal is not enough. In part this is due to the fact that in particular situations there is a threshold field or stress for the formation and/or motion of the domain wall which limits the accuracy of such an approach. This could be tolerated, however, if the devices demonstrated to date were not random in their operation. In the devices developed to date, there is no way to control where the domain wall will form within the crystal, what orientation it will take, or, once formed to what location it will move. Furthermore, once a domain wall has been formed and moved to the edge of the crystal, the application of a reverse electric field to the crystal, rather than reverse the direction of motion of that wall, can just as well nucleate an entirely new domain having a domain wall which will move in a direction perpendicular to the direction of motion of the first domain wall.

The development of a versatile information processing arrangement based on the use of coupled ferroelectric/ferroelastic crystals, therefore, requires the development of a multistable device which will not fracture in use, and in which the orientation and position of domain walls can be accurately controlled. The development of such a device is in the first instance grounded on an understanding of why coupled ferroelectric/ferroelastic crystals fracture. I have discovered that the principle reason, other than mechanical abuse, that such crystals fracture in sue is their tendency to form multiple intersecting domain walls. In gadolinium molybdate, for example, domain walls can form perpendicular to both of the two-fold rotation axes of the paraelectric phase of the crystal. As such, the walls that can be formed are essentially perpendicular to one another. If two such perpendicular domain walls intersect, the large crystal deformation associated with the ferroelastic properties will cause a stress to build up at the intersection of the walls which in turn fractures the crystal. Crystal fracture can be prevented then, by either insuring that the means used to nucleate domains and thereby form the associated domain walls will only form domain walls having a single orientation, or by including in the arrangement means to prevent the formation of domains with walls having any orientation other than the desired orientation. Either of these solutions, in addition to preventing crystal fracture, would remove at least one degree of randomness from the behavior of the crystal, i.e., randomness in the orientation of the domain wall formed. Control of the second degree of randomness, i.e., randomness in the position of the domain wall, however, presents an additional problem in that the means used to move and position the wall will inherently nucleate domains which may or may not have the desired orientation. The means used to control the position and motion of the domain wall, therefore, must be one which will not encourage the development of spurious domain walls, i.e., wall having other than the desired orientation, or additional unwanted walls having the proper orientation. I have discovered a device in which, in contrast to those disclosed by the prior art, the position of a domain wall within a coupled ferroelastic/ferroelectric crystal can be varied and completely controlled without causing either the nucleation of spurious domains or crystal fracture.

SUMMARY OF THE INVENTION

The multistable element of the present invention comprises a coupled ferroelectric/ferroelastic single crystal plate exhibiting uniaxial electric polarization cut with faces intersecting the ferroelectric axis and preferably perpendicular thereto i. means to define a switching region in said plate occupying less than the total length of said plate, ii. means to control the motion of domain walls along the length of said switching region, including electrodes on opposite faces of said plate and means to control the transfer of charge between the electrodes. Optionally the means to control the motion of the domain wall includes mechanical stress applied along the width of the plate;

iii. means to prevent the nucleation of spurious domain walls; and iv. optionally means are provided to nucleate domain walls across the plate at a predetermined position along the length of the plate.

In this specification the length of the ferroelectric/ferroelastic plate is taken as the axis along which the domain walls move in switching the crystal. The width of the plate is taken as the direction along the desired domain walls.

The means to define a switching region may be electrical, mechanical or both. In the electrical method, the switching region is defined by an electrode or set of electrodes on at least one of the two faces, preferably covering substantially all of the switching region, so that the field from the electrodes outside the switching region is reduced below the threshold value required to move or nucleate a domain wall. The switching region may be "closed", i.e., both ends of the crystal along the length thereof are outside the switching region so that the movement of domain walls is confined to a part of the crystal and cannot move out of the crystal. The switching region can also be "open", i.e., domain walls are prohibited from moving into a region adjacent one end along the length of the plate. A region outside the switching region will be referred to hereinafter as a prohibited region. A closed switching region will have two prohibited regions, the boundaries between the prohibited regions and the switching region defining the limits of travel of domain walls. An open switching region will have one prohibited region. The boundary between a switching region and a prohibited region of the ferroelectric/ferroelastic plate must be a straight line extending substantially across the width of the plate and parallel to the desired domain walls.

The preferred method of defining the switching region is to mechanically clamp the prohibited regions by cementing a rigid plate thereover. A clamp may be used as a support for the multistable member. If two clamps are employed to define a closed switching region, one clamp must be moveable relative to the second clamp.

If the end opposite the prohibited region of a crystal plate having an open switching region is cut parallel to the domain walls, the walls can pass out of the plate. If the end is cut at an angle, it is difficult to expel a domain wall. Accordingly, such shaping of a crystal plate can be used to confine domain walls.

In the present invention the crystal plate switches by movement of domain walls along the length of the plate in the switching region. The motion of the domain walls can be controlled by electrical means alone, or by a combination of electrical and mechanical means.

The spontaneous polarization produces a virtual charge at the surface of the plate which must be compensated by ions attracted thereto in the case of an unelectroded surface or by a charge on electrodes deposited on the faces. In switching the virtual charges on the faces of the ferroelectric/-ferroelastic crystal are reversed. This requires a flow of charge from one electrode on a face of the plate to the opposite electrode. Accordingly in all cases there are provided electrodes on the faces of the crystal plate preferably covering substantially the entire switching region, and a circuit connecting the electrodes through which the charge is transferred.

In switching the virtual charges on the faces of the ferroelectric/ferroelastic crystal corresponding to the termination of the electric polarization vector, are reversed. This requires a flow of compensating charge from one electrode on a face of the crystal plate to the opposite electrode. Accordingly, in all cases there are provided electrodes on the face of the crystal plate, preferably over substantially the entire switching region, and a circuit connecting the electrode through which the charge is transferred.

In switching the plate by an electric field alone, a voltage is applied between the electrodes on opposite faces of the plate to produce a field favoring the desired switched state. In general there will be a threshold value of the field below which the applied voltage has little effect on the motion of the domain wall. Above the threshold voltage the crystal plate switches by lateral motion of the domain wall or walls present in the switching region, the rate being proportional to the field. As the field is increased a value will be reached at which switching will occur by nucleation of additional domain walls, rather than by the simple lateral motion of domain walls already present. This phenomenon sets one upper limit on the velocity of lateral motion which can be achieved with an electric field alone. The threshold field is apparently related to crystal defects and varies from crystal to crystal and sets a practical lower limit on the rate at which a domain wall can be moved.

While the motion of domain walls along the length of the plate can be controlled by the time the electric field is applied to the wall, it is difficult to obtain precise and reproducible movement of domain walls by this method. Accordingly, in one embodiment of this invention, at least one face of the crystal plate in the switching region is electroded with a shaped electrode or an electrode set which provides a predetermined spatial field distribution on application of fixed voltages to the electrodes.

Thus electrodes can be applied so that at a given voltage the field varies monotonically along the length of the plate. The position of the domain wall can be made to correspond to the applied voltage to such an electrode set.

In another embodiment, one face of the crystal plate is electroded to provide a field having a series of minima at precise locations along the length of the switching region thereby providing domain wall storage locations so that a domain wall can be transferred rapidly from one storage location to an adjacent storage location, thus forming a multistable element. It will be noted that the edge or edges of the switching region can be considered to be storage locations in such applications.

As noted above, the domain walls can be moved by mechanical stress coupled with means to transfer charge from one face to the opposite face of the plate. Force is applied in a direction parallel to the domain wall at one end of the crystal plate. This generates a shear stress across the domain wall, whereupon the domain wall moves. The motion can be controlled by the force and/or by the means to transfer electrical charge. Thus, if both faces of the switching region are fully electroded and connected through a resistor, for a given force the rate of wall travel will vary with the resistance.

A valuable method of moving or driving the domain wall is to apply mechanical stress coupled with an electric field. Initially the field opposes the mechanical stress so that the wall remains stationary. The field is then reversed in polarity whereupon the domain wall traverses the crystal plate under the combined effects of electrical and mechanical stress. By this means higher wall velocities can be obtained than is possible with electrical stress alone.

Mechanical stress favors only a single orientation for a domain wall in contrast to electrical stress which is equally favorable to both possible domain walls in ferroelectric/ferroelastic crystal exhibiting uniaxial behavior.

Shaped electrodes can be employed with the combination of electrical and mechanical stress as described hereinabove.

In many embodiments of the present invention and particularly when a closed switching region is employed, it is desirable to retain a single domain wall in the switching region. This can be achieved by placing the entire crystal plate between electrodes, switching the crystal to a single domain state and then producing the desired domain wall by mechanical pressure. When the closed switching region is defined by clamps the desired trapped domain wall must be created before the clamps are applied. Thereafter the domain wall is trapped in the switching region. In other embodiments a stream of domain walls can be produced from a nucleating station source at a predetermined part of the switching region. The source can be a means of locally increasing the total distance over which field is applied across the plate, such as by electrode shaping. A voltage pulse then nucleates domains at this source.

When nucleation occurs inside the switching region, the walls are nucleated in pairs defining a new domain, the two walls moving in opposite directions under the influence of a switching field. At the edge of the switching region the walls either move out of the crystal plate, or pairs of successive walls annihilate each other. Thus a nucleating station can be employed adjacent to one end of either a closed or an open switching region to generate a stream of domain walls moving across the plate.

The above means further provides a method of obtaining domain walls oriented in a predetermined direction. Because of the ferroelastic properties of the crystal, the domain walls tend to be highly planar and extend from edge to edge of the plate: The presence of such domain walls tends to prevent the formation of spurious domains. Further the provision of a switching region inhibits the formation of undesired domain walls running the length of the plate while admitting the desired transverse domain walls.

Additionally specific means should be provided to inhibit the nucleation of spurious domains. Such means include i. polishing the edges of the crystal plate traversed by the wall, ii. polishing the corners forming the intersection of the edges with the faces of the plate, and iii. slightly removing the electrodes from the vicinity of the edges.

A preferred method of removing the electrodes from the edges of the plate is to completely electrode the surface of the plate and then round the corners of the plate by lapping.

Not all ferroelastic/ferroelectric crystals will function in the present invention. In the first place, the ferroelectric and ferroelastic phases must be coupled, and in the second place, from the point of view of information processing arrangements, the most useful crystals are those that can be constrained to exhibit planar domain walls confined to a set of planes all parallel to one axis. In order for a coupled ferroelectric/ferroelastic crystal to have such planar domain walls, the crystal must behave uniaxially; that is, the electric polarization must be constrained to lie in one direction or the other along a specific axis. In addition to this, in the most useful crystals, the planar domains walls occupy only a finite number of specific orientations within the crystal, and they must be capable of being moved in a controlled manner by external control of the electric field or mechanical stress configurations. For the purposes of this invention, therefore, the crystal used in the multistable element must be a coupled ferroelectric/ferroelastic single crystal exhibiting uniaxial electric polarization.

The most well known crystal exhibiting all of these features is β'-gadolinium molybdate. There are, however, a large number of other crystals which are useful in the present invention. Using group theoretical analysis, such as that developed and discussed by L. S. Shuvalov in his article on "Symmetry Aspects of Ferroelectricity" in the Journal of the Physical Society of Japan (28 Supplement, 38, 1970) and by K. Aizu in his article on "Possible Ferroelectric and Ferroelastic Crystals and or Simultaneous Ferroelectric and Ferroelastic Crystals" in the same Journal (27, 387, 1969), the following table (Table I), which lists the point group associated with all crystals that are useful in the present invention, has been developed.

TABLE I

| 1 | 2 | 3 | 4 |
|---|---|---|---|
| Allowed Aizu groups for reversible ferroelectric/ferroelastic materials | Ferroelectric polarization axes, referred to symmetry axes of paraelectric phase | Number of possible polarization axes | Axes normal to useful wall planes, referred to symmetry axes of paraelectric phase |
| Uniaxial: | | | |
| 42mFmm2 | 4 | 1 | 2 |
| 4F2 | 4 | 1 | 2 |
| 222F2 | 2 | 1 | 2 |
| Multiaxial: | | | |
| 42mF2 | 2 | 2 | 2 |
| 422F2 | 2 | 2 | 2 |
| 622F2 | 2 | 3 | 2 |
| 43mFmm2 | 4 | 3 | 2 |
| 23F2 | 2 | 3 | 2 |

In Table I, the first column specifies, in Aizu's notation, the paraelectric and ferroelectric phase point group symmetries above and below the Curie point, for all possible systems that fill the requirements listed above. In this notation, the point group written to the left of the F represents the point symmetry of the high temperature phase while that on the right represents the low temperature, ferroelectric phase. This in itself constitutes a complete list of useful crystals. The second column gives the electric polarization axes of the ferroelectric phase in terms of the symmetry axes of the paraelectric phase. The third column gives the number of such possible polarization axes. In the first three cases, unity indicates that the ferroelectric phase is uniaxial, as desired for this invention. In the remaining cases, the electric polarization can be directed in either sense along each of several axes, but material in these multiaxial classes will, nevertheless, be useful for this invention, if polarization along all except one of the allowed axes is suppressed. In the fourth column, the axes that are normal to the allowed domain wall planes are specified in terms of the paraelectric symmetry axes. In each case, the allowed domain wall must be perpendicular corrected for small spontaneous crystal deformation at $T_c$, to a two-fold rotation axis of the paraelectric phase.

By way of explanation, it should be noted that, in diffusionless phase transitions occurring in crystalline material, the point group of the low temperature phase must generally be a subgroup of the high temperature phase. To develop coupled ferroelastic/ferroelectirc properties, the high temperature phase must possess a piezoelectric coefficient that has a finite component along the axis of polarization of the low temperature phase. Furthermore, the direction of polarization of the low temperature phase must be along the equivalent directions of the high temperature phase; that is, the possible directions of polarization of the low temperature phase must be convertible, one to another, by the symmetry operations of the high temperature group. The symmetry elements of the high temperature group that are missing in the low temperature group become the "twinning" elements of the low temperature crystal. Furthermore, the number of possible domain orientations is equal to the order (number of symmetry operations) of the paraelectric point group divided by the order of the ferroelectric point group. For the reversible ferroelectrics included in Table I, the number of domain orientations will always be even, as shown by column 4, since it is possible to direct the polarization in either sense along each of the allowed polarization axes, and each wall orientation will contain a polarization axis.

Since in the piezoelectric effect, the strain is an odd function of the polarization, the requirement for a finite piezoelectric coefficient along the axis of eventual polarization, mentioned above, means that, when the sign of the polarization is reversed, at least some of the mechanical lattice strains that occur because of the piezoelectric effect will also be reversed in sign. Therefore, the new Bravais lattice in the switched region of the crystal, although identical with the old Bravais lattice, cannot constitute a grid totally coincident with it without whole crystal movement. The new Bravais lattice will therefore be "non-collinear" (in the language of Shuvalov) with the old Bravais lattice, and the two lattices can, therefore, only remain joined without serious lattice distortion along certain common crystallographic planes. Furthermore, to preserve crystal continuity of a multi-domain coupled ferroelectric/ferroelastic crystal, the crystallographic axes of opposite domains must be differently oriented, which, in turn, requires whole domain motion. For example, in the case of gadolinium molybdate, the {110} planes approximately normal to a domain wall change orientation by 0.3° in the {001} plane at the domain wall. Where a domain wall is desired but does not exist, therefore, one can be produced by applying an external stress to the crystal to deform the crystal in the manner attendent upon the presence of the desired wall. Conversely, when two walls of different allowed orientation intersect, the necessary whole domain deformation associated with one wall interfers with that of the other wall, and large, potentially destructive, strains develop. This can be avoided, however, if the whole crystal motion necessarily attendent on the formation of walls having one of the allowed orientations is inhibited by externally applied mechanical means, in which case, formation of walls having this particular orientation is inhibited and the potentially destructive strain associated with the intersection of this wall with another perpendicular wall never develops.

For purposes of the following discussion the term coupled ferroelectric/ferroelastic crystals exhibiting uniaxial electric polarization will be considered to be identical with the term ferroelectric/ferroelastic crystal exhibiting uniaxial electric polarization and having domains with non-collinear Bravais lattices. Both terms will include all the crystals in the following Aizu point groups: $\bar{4}2mFmm2$, $\bar{4}F2$, 222F2, $\bar{4}2mF2$, $\bar{4}22F2$, 622F2, $\bar{4}3mFmm2$ and 23F2, all of which are listed in Table I. By definition the terms will also refer and be limited to these crystals in their ferroelectric state, i.e., in the state below their respective transition temperature. The preferred crystals come from the following uniaxial point groups listed in Table I: $\bar{4}2mFmm2$, $\bar{4}F2$ and 222F2. A partial list of crystals known to exhibit a symmetry change that falls within the indicated Aizu point group is given in Table II.

TABLE II $\bar{4}2mFmm2$
- $Gd_2(MoO_4)_3$
- $KH_2PO_4$

222F2
- $NaKC_4H_4O_6 \cdot 4H_2O$
- $RbH_3(SeO_3)_2$

23F2
- $(NH_4)_2Cd_2(SO_4)_3$
- $NH_3(CH_3)Al(SO_4)_2 \cdot 12H_2O$ $\bar{4}3mFmm2$
- $M_3B_7O_{13}X$ wherein M is a cationic constituent, usually divalent, e.g., Mg and X is an anionic constituent, e.g. a halogen atom (but only when the structure indicated falls within the symmetry group $\bar{4}3mFmm2$).

The most well known crystals displaying coupled ferroelectric/ferroelastic behavior are crystals having the gadolinium molybdate structure falling into the class represented by the formula $(R_xR'_{1-x})_2O_3 \cdot 3M_{1-e}W_eO_3$ wherein R and R' represent scandium, yttrium or a rare earth element having an atomic number of from 57 to 71, $x$ is from 0 to 1.0 and $e$ is from 0 to 0.2. These crystals are described more fully in U.S. Pat. No. 3,437,432, issued to H. J. Borchardt on Apr. 8, 1969, and assigned to the assignee of the present invention. More specifically, it is the ferroelectric/ferroelastic phase, commonly referred to as the $\beta'$ phase of these gadolinium molybdate type materials, that exhibit coupled ferroelectric/ferroelastic behavior. Insofar as is necessary for a proper description of the present invention, the disclosure of both of these references is hereby incorporated into this specification. Crystals having the $\beta'$-gadolinium molybdate structure fall into the Aizu group $\bar{4}2mFmm2$. These materials display two orientations of domain walls which are normal to both two-fold rotation axes of the paraelectric group, $\bar{4}2m$. The electric polarization vector lies along the four-fold fold rotary inversion axis of the paraelectric phase in one or the other of the equivalent directions parallel thereto. These two directions are equivalent because they are interconverted by the two-fold rotation operations. Accordingly, these operations are lost as symmetry elements in going through the transition to the mm2 ferroelectric phase; and they become the "t-winning" operations that interconvert the ferroelectric-ferroelastic domains.

I have found that a number of the crystals described by Borchardt, specifically $\beta'$-$DyGd(MoO_4)_3$, $\beta'$-$Nd_{0.2}Tb_{1.98}(MoO_4)_3$, $\beta'$-$Gd_2(M_{0.90}W_{0.1}O_4)_3$, $\beta'$-$SmGd(MoO_4)_3$ and those crystals represented by the formula $\beta'$-$X_2(MoO_4)_3$, where X can be Nd, Sm, Eu, Gd or Tb, display planar domain walls that occupy {110} lattice planes. For the purpose of this invention this means that they can be treated as identical with $\beta$-gadolinium molybdate.

Furthermore, from a macroscopic point of view, I have found that there are two types of domain nucleation that occur in $\beta'$-gadolinium molybdate type structure. In one, which will be referred to as Type A, a domain wall extending from one edge of the crystal to another is formed. This type of nucleation occurs only along the edges of the crystal, and occurs most easily at narrow parts of the crystal where the distance between the two edges spanned by the domain wall is small, or, more specifically, where the area of the domain wall at the point of formation is small. It is characterized, on a macroscopic scale, by the fact that a single domain wall is formed which moves through the crystal as the domain grows from one edge of the crystal to the other. In the second type of domain nucleation, which will be referred to as Type B, two parallel domain walls of opposite sign are formed at one edge of the crystal and join at a point within the crystal. Because of the large elastic strain associated with any non planarity of the walls very little wall bending occurs, and, therefore, in rare earth molybdates such as $\beta'$-gadolinium molybdates Type B domains assume a thin blade-like shape with almost, but not quite, planar walls. These domains nucleate at one edge of the crystal and, as they grow, the intersection of the two walls moves across the crystal until it reaches a second edge at which point the walls separate and move in opposite directions. This domain, therefore, is characterized on the macroscopic scale, by the fact that two parallel domain walls are formed which move in opposite directions as the domain grows. On a microscopic scale, it may be that Type A nucleation is merely a species of Type B nucleation, occurring at a microscopic projection on an otherwise perfectly cut plane. One of the walls thus formed moves into the bulk of the crystal and is observed as the single domain wall of Type B nucleation while the other exits the crystal.

When the crystal employed in the multistable element is a crystal having the $\beta'$-gadolinium molybdate structure, it is a substantially rectangular crystal cut with surfaces parallel to the {001} crystal planes and having at least two edges cut parallel to a single <110> axis. The crystallographic indices used here refer to the axes of the low temperature orthorhombic unit cell. The electrodes are positioned on the {001} surfaces, the nucleating means is selectively positioned to nucleate domains having a domain wall perpendicular to the aforesaid single <110> axes, and the mechanical clamp is selectively positioned on the {001} surfaces of the crystal, covering at least a portion of the two edges of the crystal oriented perpendicular to the domain wall, so that deformation of the crystal across any plane other than a plane parallel to the domain wall is inhibited. In another embodiment, at least one of the final two edges of the crystal is cut at an oblique angle relative to an adjacent edge or surface of the crystal. This provides a region at the end of the plate where domains having domain walls of reduced length can be formed, and it has been found that such domains are more readily nucleated than domains extending the entire width of the plate.

For a better understanding of the present invention, reference is made to the following figures:

BRIEF DESCRIPTION OF THE DRAWINGS

FIGS. 8a, b and c, which are top, bottom and side views of another embodiment of the present invention, useful as a multistable element, illustrating particular electrode means;

FIGS. 9 and 10, which are top views of other embodiments of the present inventions showing electrode structures which will allow continuous positioning of the domain wall within the crystal;

DETAILED DISCUSSION OF THE DRAWING

Figure 1:
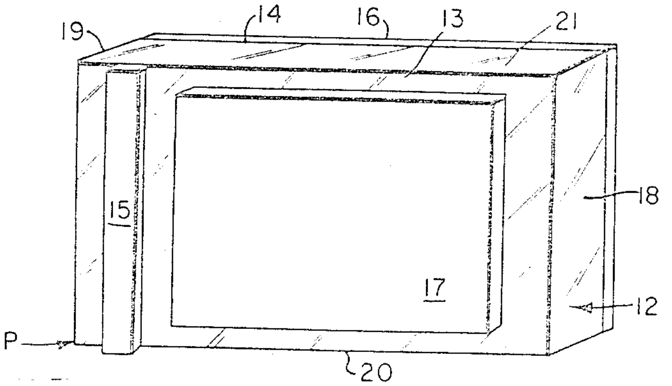
FIG. 1, which is a perspective view of one embodiment of the present invention showing electrodes selectively positioned on the coupled ferroelastic/ferroelectric single crystal to provide a fracture free bistable element.

In FIG. 1, a coupled ferroelastic/ferroelectric single crystal exhibiting uniaxial electric polarization 12, has been cut into a thin chip having two parallel surfaces 13 and 14 which are perpendicular to the electric polarization vector of one of the possible ferroelastic domains of the crystal. In the context of the present invention the word cut is meant to include cleaving along cleavage points as well as cutting along cleavage and non-cleavage planes. In the configuration illustrated, the means for nucleating a domain is an electrical means comprising electrodes 15 and 16. Application of a voltage above a certain threshold voltage to these electrodes will produce an electric field in the crystal which will in turn cause the nucleation of the domain. Electrode 16 covers one entire surface of the crystal; electrode 15 must be oriented so that the gap between electrode 15 and 17 is parallel to one of the lost two-fold rotation axis of the paraelectric phase, and preferably extends from one edge of the crystal to the other. The means to nucleate a domain could just as well have been a mechanical means to apply a force to deform the crystal across a plane perpendicular to two-fold rotation axis of the paraelectric phase. Such a means designed to apply a force to point P on the crystal would nucleate a domain similar to the one nucleated by electrodes 15 and 16, but there would be some variation in the position of the domain wall. The electrical means illustrated will nucleate a domain within a region underneath electrode 15.

Electrodes 16 and 17 define a switching region in the crystal, coextensive with electrode 17. By applying a voltage between electrodes 15 and 17, the domain wall located under electrode 15 can be moved to a position near electrode 17 and then by applying a voltage to electrodes 16 and 17, the domain wall can be moved through the gap and switching region to one edge of the switching region. The edges of the switching region define domain wall storage locations and by reversing the voltage applied to electrodes 17 and 16 the domain wall can be moved back and forth through the crystal from one domain wall storage location to the other.

Electrodes 15, 16 and 17 are selectively positioned to produce an electric field having a component parallel to the electric polarization vector of the domain created by electrodes 15 and 16. Normally, this is accomplished by depositing a conductive material such as aluminum, silver or copper directly on surfaces of the crystal cut perpendicular to the electric polarization vector, but any electrode means which will produce the desired field within the crystal can be used. For example, the electrodes could be displaced from the surface of the crystal and/or disposed non-perpendicular relative to the electric polarization vector so long as a component of the electric field they produce is parallel to the electric polarization vector. Also, multiple electrodes applied to the same crystal surface to create a fringe field within the crystal with a component along the polarization direction exceeding the threshold field for wall movement, could be used. Due to the effect of charge build up on unelectroded surfaces, however, actual deposition of the electrodes on the surface of the crystal is preferred.

When one or both faces of the crystal plate are partially electroded, or have more than one electrode separated by a gap or gaps, a preferred method of making the electrodes is to fully electrode the faces of the crystal by vacuum deposition, sputtering or the like, and then sputter-etch away the unwanted portions of the electrodes. If the sputter-etching is conducted in oxygen at about 8 microns pressure, the resultant surface exposed by the etching is highly insulating. If the oxygen is replaced by argon, the surface remaining is slightly conducting. The slightly conducting surface obtained by sputter-etching in argon is preferred since it prevents accumulation of unwanted charge at the surface without inhibiting the action of the electrodes.

Again, to prevent the accumulation of surface charge in areas not covered by conducting electrodes, the gaps between electrodes should be maintained as small as possible, and preferably should be less than 0.15 mm. In particular, it is desirable to have the electrodes extend to within about 0.15 mm of the edge of the crystal plate. In addition to minimizing the impedance to wall motion due to charge accumulation this prevents spalling of the crystal at the edges which can occur if the edge of the electrode is substantially removed therefrom. Polishing the edges of the crystal is also beneficial in reducing spalling of the edges. With such precautions crystals have been switching as many as $10^9$ times without apparent deterioration or breakage.

In the embodiment illustrated, the crystal is cut in the form of a rectangle with edges 18 and 19, and 20 and 21 cut perpendicular to surfaces 13 and 14. By virtue of the fact that the edges of electrode 17 are displaced from the edges of the crystal, the switching region beneath electrode 17 occupies less than the total volume of the crystal. The electric field produced by electrodes 16 and 17 will, therefore, be substantially uniform in the switching region and negligible in the regions of the crystal adjacent to the edges. In this configuration, the means to inhibit spurious domain nucleation is provided by the selective positioning of electrode 17. It is, therefore, important in this configuration that electrode 17 is displaced from at least three edges of the crystal. It has been found that domains nucleate more readily when the electric field used to nucleate them extends to the edge of the crystal. This is probably due to the mechanism of domain nucleation discussed above, since both Type A and Type B nucleations are initiated at an edge. Domain wall movement, however, can be accomplished by an electric field which does not extend to the edges of the crystal so long as the strength of the field is sufficient to produce a force on the wall which will overcome the natural impedance to wall motion across the entire width. By displacing the electrode used to define the switching region from the edges of the crystal, domain wall motion can, therefore, be achieved without the nucleation of additional domains with domain walls which would intersect the moving domain wall and lead to crystal fracture. To further inhibit spurious nucleation along edges 20 and 21, these edges should be smooth and free from nicks.

Figures 2A, 2B, 3:
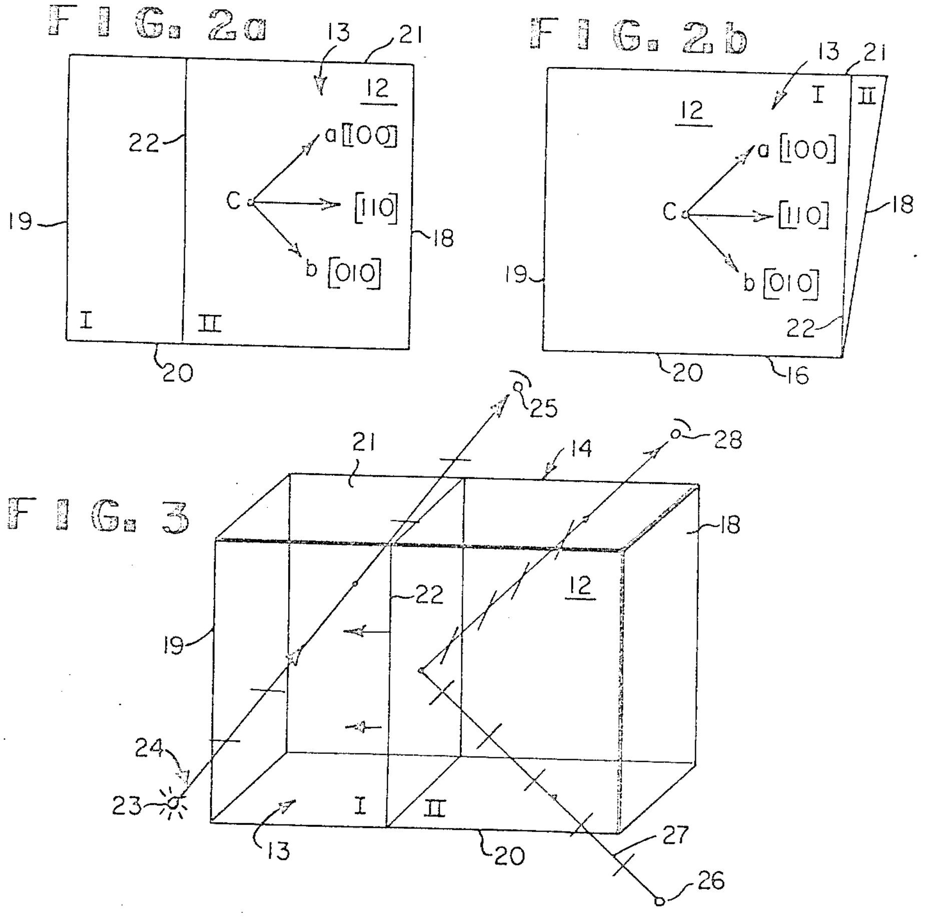
FIGS. 2a and b, which are top views of c-cut gadolinium molybdate crystals showing two possible crystal configurations useful in the present invention.
FIG. 3, which is a schematic perspective view of a coupled ferroelastic/ferroelectric crystal, showing two possible optical means for detecting the position of the domain wall.

FIGS. 2a and 2b are top views of specially cut β-gadolinium molybdate type crystals; one of the ferroelectric crystals that can be used in devices such as that shown in FIG. 1. β'-gadolinium molybdate is an orthorombic crystal, below its Curie point, in which the axis of electric polarization is parallel to the c-axis; so, in multistable devices employing β'-gadolinium molybdate crystals, the electrode bearing surfaces are cut to be bounded by {001} crystal planes, which are perpendicular to the *c*-axis. The twinning element axes in β'-gadolinium molybdate type crystals are parallel to {110} planes and only those domains having walls parallel to these {110} planes can nucleate. The edges of a β'-gadolinium molybdate type crystal used in the multistable element are, therefore, preferably cut parallel or substantially parallel to {110} planes in the crystal. It has been found, however, that if one of the edges is cut at an oblique angle relative to the {110} plane to which it corresponds, domain nucleation at this edge is enhanced. The angled edge of the crystal also acts as a domain wall storage location. When the edge is perfectly parallel to the domain wall formed, then the domain wall will exit from the crystal when it reaches the edge. If the edge is at an oblique angle relative to the wall formed, the wall will not readily exit the crystal and will be stored at the edge. For some applications, then, the configuration shown in FIG. 2b, where the crystal has at least two edges parallel to {110} crystal planes and at least one edge cut at an oblique angle relative to an adjacent edge, is to be preferred.

The embodiments discussed below can employ any coupled ferroelectric/ferroelastic single crystal exhibiting uniaxial electric polarization which are cut as described above, including the two configurations of the β'-gadolinium molybdate type crystal illustrated in FIG. 2. For convenience in the following discussion, however, and unless otherwise indicated, the crystal used in each of the embodiments discussed below will be assumed to be a β'-gadolinium molybdate type crystal, cut as illustrated, in exaggerated form, by FIG. 2b.

As illustrated in FIGS. 2 and 3, two domains, I and II, in crystal 12 cut with faces parallel to the {001} planes are separated by a domain wall 22 extending entirely through the crystal, perpendicular to the surfaces 13 and 14. A variety of means for detecting the position of the domain wall are possible. Two are illustrated in FIG. 3.

In one embodiment polarized radiation 23 is incident on the plate along the *c*-axis. On passing through domain I, the radiation is elliptically polarized by the biaxial birefringence of the domain. With appropriate orientation of the plane of polarization of the incident light and use of a quarter wave thickness for the plate, the emerging light will be circularly polarized and can thus be detected by detecting means 25 consisting of a circular analyzer and a detector for radiant energy. As the domain wall 21 traverses the plate, the light will be transmitted increasingly by domain II from which it emerges circularly polarized in the opposite sense to the light transmitted by domain I. The light passing through domain II is thus blocked by the circular analyzer and the output of the detecting means will therefore decrease as domain wall 21 traverses the plate.

If the use of this type of domain wall detection means is anticipated, the electrodes deposited on the surfaces must either have an aperture, to allow passage of the radiation beam, or the electroded surfaces must be at least partially transparent to the radiation used. In the second means illustrated, radiation 27 from radiation source 26 is obliquely incident on the domain wall through one of the edges of the crystal, and is, therefore, reflected off of the domain wall. One, or a series of radiation detection means, 28, is used to monitor the position of the domain wall. If the use of this type of detection means is anticipated, the electrodes deposited on the surfaces of the crystal need not be apertured or partially transparent to the radiation used. Other detection means such as strain gauges and variable capitance devices which depend on the physical deformation of the crystal can also be used without modification to the electrode. In the following discussion it will be assumed that the electrode means is adapted for use with the particular domain wall detection means anticipated.

Figures 4, 5:
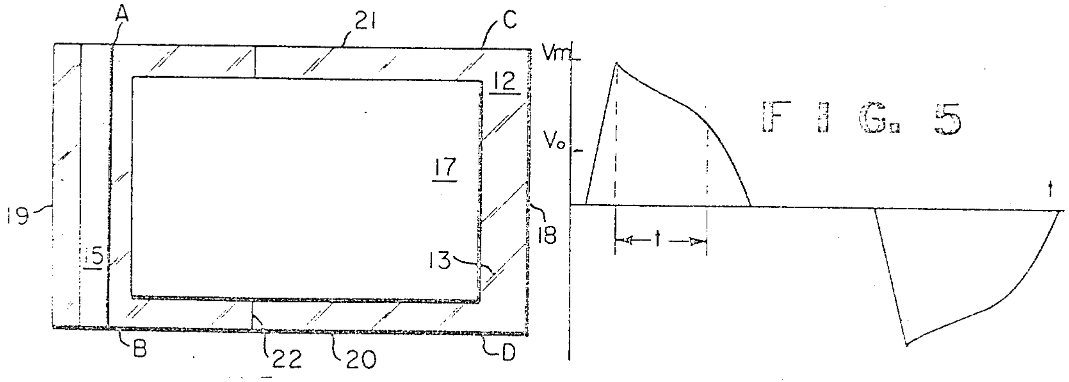
FIG. 4, which is a top view of another embodiment of the present invention, showing the electrodes selectively positioned on the crystal to provide a fracture-free bistable element.
FIG. 5, which illustrates the shape of a voltage pulse, useful in controlling the position of domain walls within a multistable element such as that shown in FIG. 4.

FIG. 4 is a top view of an element such as that shown in FIG. 1. Electrodes 15 and 17 are shown on the top surface. We will assume in the discussion of this figure and, unless otherwise indicated, in the discussion of all following figures that the bottom surface is totally electroded with electrode 16, but it must be realized that the bottom surface could contain multiple electrodes positioned to perform various other functions. Electrode 15 is selectively positioned to nucleate a domain having a domain wall parallel to one {110} plane in the crystal, and a voltage applied between electrodes 15 and 17 sufficient to cause such a domain to nucleate. The magnitude of the voltage needed to cause such nucleation will depend on a number of factors including the thickness of the crystal and the type of crystal used, since each crystal has its own threshold field for domain nucleation. In general an electric field of at least 100 volts/cm., preferably 500 volts/cm. is necessary to nucleate and move a domain. Specifically, for a typical quarter wave plate crystal of gadolinium molybdate (0.37 mm. at 5,500A) a voltage of 50 volts applied across the crystal has been found to be sufficient to nucleate and move domain walls across the crystal. The selection of the voltage applied to the electrodes is within the skill of one normally skilled in the art, the only criterion being that the voltage used to nucleate and/or propagate the domain should be below the breakdown voltage of the crystal.

FIG. 4 illustrates an embodiment of the invention in which there are two domain wall storage locations, designated by A–B and C–D, located at the edge of the switching region. Once the domain wall 22 is located under electrode 17, which defines the switching region, then the application of the proper voltage to electrode 17 will cause the domain wall to move through the switching region to domain wall storage location C–D. Reversing the polarity of the electric field will reverse the direction of motion of the domain wall and it will move to the storage location at A–B, creating a bistable element. In most instances, however, the wall will stop at a storage location slightly beyond the edge of electrode 17 which, while inside the switching region, is at a position where a reverse field of the same strength is slightly less than that necessary to start the wall moving in the opposite direction. To overcome this difficulty, voltage pulses such as that shown in FIG. 5 are used. The voltage pulse initially raises to a voltage Vm which is sufficient to raise the strength of the fringe field at the edge of electrode 17 to the point where the wall can be recalled from its storage location. After that, it decreases to a lower value which is still above the threshold voltage Vo required to move the wall. During the time interval t the voltage applied to the electrodes is sufficient to move the wall, and if t is long enough, depending on the amplitude of the voltage applied, the wall will move from one storage location to the other. A pulse of similar shape with reverse polarity will retrieve the wall from the second storage location and move it back to the first storage location.

Figure 6:
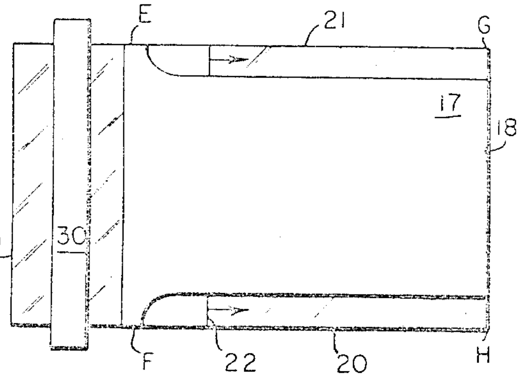
FIG. 6, which is a top view of another embodiment of the present invention.

In FIG. 6, the top electrode 17 is a T-shaped electrode with the arms of the T extending to two {110} edges of the crystal, the base of the T extending to a third {110} edge and the cross bar displaced from the final {110} edge. The application of a voltage to electrode 17 will cause a type B domain to nucleate in the region E–F. One domain wall will move towards edge 19 and stop at the edge of electrode 17. The other domain wall will move towards edge 18 and if that edge is cut parallel to {110} crystal planes, will exit the crystal at that point. Applying a second pulse of reverse polarity to electrode 17 will, rather than nucleate a new domain, move the domain wall stored at the edge of electrode 17 nearest edge 19, towards edge 18 and out of the crystal. A third pulse will start the procedure, from the nucleation of a new domain at E–F, over again. This configuration, then, will produce a stream of domain walls moving from E–F to edge 18 when voltage pulses of alternate polarity are applied to electrode 17. Since electrode 17 is displaced from three edges of the crystal, except at points E and F where nucleation is desired, spurious nucleation is inhibited. To further insure that spurious nucleation will not occur, a mechanical clamp 30, such as that discussed below can be applied to the crystal, on the {110} surfaces at the end of the crystal containing the arm of the T-shaped electrode.

Figure 7A:
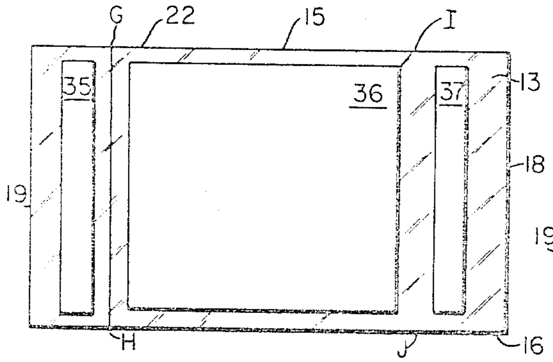
FIGS. 7a and b, which are top and side views of another embodiment of the present invention, useful as a bistable element, illustrating particular electrode means.
Figure 7B:
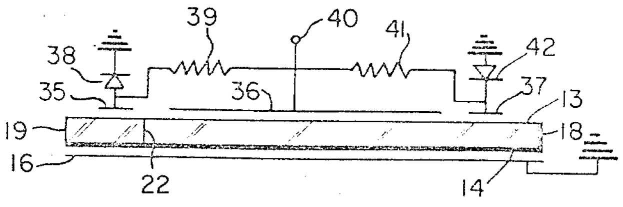

FIGS. 7a and b illustrate another embodiment of the present invention in which a domain wall 22 can be switched between two storage locations G–H and I–J without the use of shaped voltage pulses. In this embodiment, the bottom surface is completely electroded and grounded. The upper surface 13 contains three electrodes. One electrode 36 in combination with the bottom electrode defines a switching region within the crystal. The other two electrodes 35 and 37 respectively are disposed adjacent to electrode 36 and displaced from it by narrow gaps (with long dimensions parallel to the domain wall) which comprise the domain wall storage locations G–H and I–J respectively. A voltage applied between electrode 36 and 16 will move wall 22 from one side of the switching region to the other, but when the wall stops in the storage location, it is beyond recall by the normal field. If a constant amplitude voltage pulse is used, to recall a wall from storage location G–H, a voltage must be applied to both electrode 35 and 36, but not to electrode 37, so that the field in the gap between 35 and 36 is high enough to move the wall, but the field in the gap between electrode 36 and 37 is not high enough to drive the wall beyond the gap. Similarly, to move a wall located in storage location I–J a voltage must be applied to electrodes 36 and 37 not to electrode 35. One way to achieve this is to use the circuit indicated in FIG. 7b. A negative input voltage to point 40 will appear on electrodes 35 and 36, but will pass to ground through diode 42 so that it will not appear on electrode 37. A positive voltage applied to point 40 will appear on electrodes 36 and 37, but not on electrode 35 because it will pass to ground through diode 38. Resistors 39 and 41 are used to provide a high impedance at point 40 so that diodes 42 and 38 do not short point 40 to ground.

FIG. 7 illustrates a multistable element with two domain wall storage positions. It is a bistable element. FIG. 8 illustrates a multistable element with five domain wall storage locations. More or fewer positions an be provided if desired. In FIG. 8, five gaps are provided between two interdigitated electrodes 43 and 44. These gaps constitute the domain wall storage locations K, L, M, N, O. The domain wall 22 is shown at storage location K. The bottom electrode structure is similar to that discussed above in conjunction with FIG. 7. Electrodes 35 and 37 in conjunction with electrodes 43 and 44, respectively, are used to permanently retain the wall within the switching region by creating electric fields opposed to those creating the motion of the wall. Electrode 36, in conjunction with electrodes 43 and 44 provides the motive force; the polarity of the voltage V (which must be greater than the voltage of batteries 46 and 47) applied to this electrode 36 determining the direction of motion of the wall. The force on a wall located beneath electrodes 43 and 44 is proportional to the difference between the voltage applied to electrode 36 and that applied to electrode 43 or 44, respectively. The voltage supplied to electrode 43 by batteries 46 and 47 is the negative of the voltage applied to electrode 44. Resistors 48 and 49 permit current to flow to ground. When reversing switch 45 is in one position a positive voltage is applied to one of electrodes 43 and 44 and a negative voltage to the other. Reversing the switch reverses the polarity of the voltage applied to each electrode. With the polarity of the voltage applied to point 40 set, reversing switch 45 will cause the domain wall to jump successively from gap to gap. Reversing the polarity of the voltage applied to point 40 will cause the domain wall to jump in the opposite direction.

The embodiments discussed above will cause incremental motion of the wall. In the two embodiments discussed below, the wall can be moved continuously, and positioned at any point in the switching region.

In FIG. 9, the electrode deposited on the {001} surface 13 is an apertured electrode 50. The opposite surface is completely electroded. I have found that the force exerted on the wall causing its motion is proportional to the length of the wall under the electrode. By providing an aperture 51 in electrode 50, the length of the wall under various parts of the electrode is variable so that applying a fixed voltage to the electrode will move the wall to a fixed position within the switching region, defined by the aperture, when the force on the wall drops below that just equal to the force to move the wall. A wedge shaped aperture, which allows a wall to be positioned at any location within the aperture is illustrated, but various other shaped apertures are also possible.

In FIG. 10, interdigited wedge shaped electrodes 52 and 53 are positioned on surface 13, and the bottom surface is completely electroded. A single wedge shaped electrode would suffice, so long as the net driving force exerted on the wall by the electric field is a monotonically increasing function of the distance along an axis parallel to the direction of motion of the domain wall, but two wedge shaped electrodes provide more positive control. In the embodiment shown in FIG. 10, the force exerted on the wall causing it to move is the sum of two forces; one proportional to the product of the length of the wall under electrode 52 times the voltage applied to electrode 52, the other proportional to the product of the length of the wall under electrode 53 times the voltage applied to electrode 53. By varying the magnitude and sign of the voltage applied to each electrode, the wall can be moved to any position within the switching region where the net driving force drops below the threshold force for domain wall motion.

Figure 11:
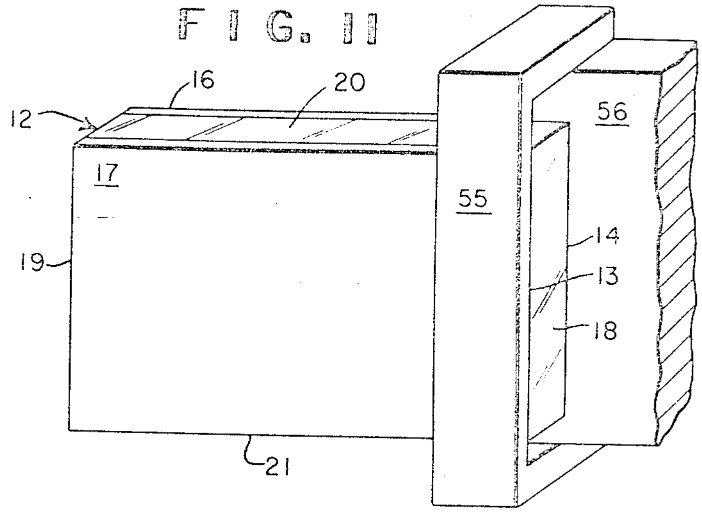
FIG. 11, which is a perspective view of another embodiment of the present invention showing the application of a mechanical clamp to a gadolinium molybdate crystal.
Figure 12:
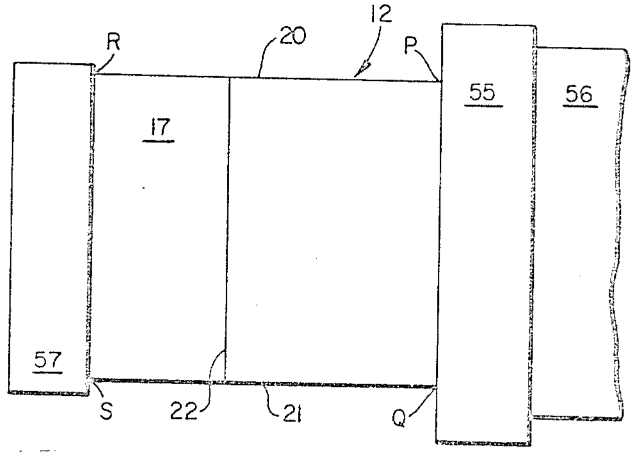
FIG. 12, which is a top view of a bistable element employing the clamping arrangement illustrated in FIG. 11, and FIG. 13, which is a schematic view of crystal, electrode, clamp and detection means combination.

One way of inhibiting the formation of spurious domain walls has been discussed above. Another way to achieve the same result is illustrated in FIG. 11 where a mechanical clamp, 55, is attached to at least one of the electrode bearing surfaces of the crystal 12. This clamp defines a clamped zone, extending across the entire surface of the crystal and having at least one edge parallel to the domain wall, in which the formation of domain walls extending from one edge of the crystal to the other is inhibited for all orientations other than the desired orientation by inhibiting the deformation of the crystal beneath the clamp. Such deformation is essential if the wall is to extend under the clamped region. In FIG. 12 the crystal is a c-cut $\beta'$-gadolinium molybdate crystal, and the clamp is selectively positioned on one of the surfaces of the crystal, 13, intersecting a portion of each edge 20 and 21, and having its edges parallel to the desired wall orientation.

The clamp is constructed of a rigid and preferably non-conducting material such as glass and attached to the crystal plate so that the deformation of the crystal under the clamp is prevented. The clamp can be cemented to the crystal using a cement which does not shrink on setting so that strain is avoided which can induce unwanted domains under the prohibited region covered by the clamp. It is important to obtain a cement line at the edge of the clamp which is linear and accurately aligned across the crystal plate parallel to the domain walls. To achieve this the clamping plate is placed on the crystal plate and aligned, then the cement (which should be of low viscosity) is flowed between the clamp and crystal plate by capillary action. An alphacyanoacrylate cement has the desired characteristics.

In the case illustrated, the clamp 55 is also used to mount the crystal 12 to a support 56. Both surfaces of the crystal 13 and 14 can be entirely electroded. It is best, however, if the region under the clamp is not electroded.

The mechanical clamp can be used in conjunction with any of the devices discussed above, for added insurance against crystal fracture, but as shown in FIG. 12, mechanical clamps alone can be used to produce a bistable element having a closed switching region. In this configuration clamp 57 has been added to FIG. 11, and domain wall storage locations are located at the edge of each clamp P–Q and R–S. At least one of the clamps must be mounted so that the crystal is free to deform, i.e., both ends of the crystal cannot be clamped to the same support. The wall 22 is retained in the crystal. Application of a voltage to the electrode 17 will cause this wall to move from one storage location to the next, and reversal of the polarity will reverse the direction of the domain wall motion.

Figure 13:
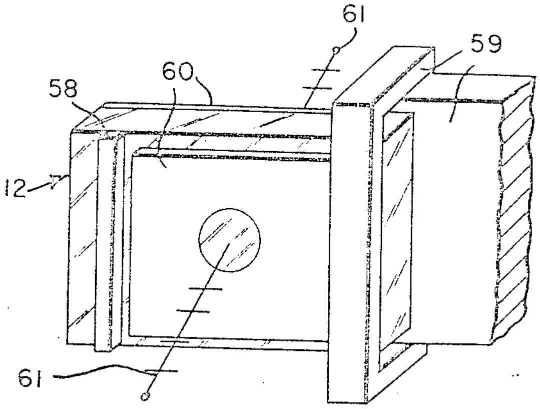

The various features of the multistable element described above are useful in various combinations, such as the one illustrated in FIG. 13, which shows a combination comprising a non-collinear ferroelectric single crystal exhibiting uniaxial behavior 12 having a domain wall with a specific orientation within the crystal, means for preventing the formation of domain walls in the crystal having an orientation other than the specific orientation 58, 59, means 60 for moving the domain wall from one position to another, particularly to domain wall storage location, within the crystal in a controlled manner and along a fixed axis, and means for detecting the position of the domain wall 61. The various features of such a combination can be varied from those illustrated in FIG. 13, as discussed above, and as would readily occur to those skilled in the art. Such a combination would be useful in processing information in the form of electrical signals comprising: nucleating a domain wall in the crystal; moving the domain wall through the crystal to one of a plurality of storage locations in response to the electrical signals by applying the electrical signals to at least one of a plurality of electrode means selectively positioned on the crystal to adjust the polarity and maintain both the strength and duration of the electric field within a switching region of the crystal at values which will move the domain wall through the crystal to the storage location; storing the domain wall at the storage location by decreasing the strength of the electric field in the crystal at the storage location below that necessary to cause the domain walls to move; and monitoring the position of the domain wall.

The foregoing description has been limited to elements wherein the domain wall is driven across the switching region by electrical stress. In addition, a domain wall can be driven across the switching region by mechanical stress as noted hereinabove.

The use of mechanical stress in addition to electrical stress offers several advantages. Electrical stress is applied parallel to the electrical axis and can favor the formation of more than one domain wall direction. By contrast, mechanical stress is directed to favor only a single domain wall orientation, and thus acts not only to drive the domain walls but to inhibit the formation of spurious domain walls. The degree of electrical stress, that is the applied electric field, is limited by the electrical breakdown of the crystal plate, and also of the media surrounding the plate (in most cases air). Further, it is found that while at low voltages switching is accomplished by lateral motion of domain walls, the velocity being an essentially linear function of the applied voltage, as the voltage increases switching may be accomplished by the nucleation of additional domain walls, which is undesirable in many applications. Mechanical switching appears to avoid many of these difficulties.

As is the case with all switching of ferroelectrics, it is necessary to transfer charge from one surface of the plate to the other. Accordingly, mechanical switching should be employed with electroded crystals and means to transfer charge between the electrodes.

The simplest means to transfer charge is to short-circuit the electrodes. In that event, the movement of the domain wall in the switching region is determined by the mechanical stress applied. For a given mechanical pressure, the rate of movement of the domain wall decreases with increasing electrical resistance between the electroded faces. Accordingly, switched fixed resistors or a variable resistor between the electrodes can be employed to control the rate of wall travel.

Instead of passive circuitry between the electrodes as described hereinabove, it is also possible to use elements such as constant or variable voltage sources to add to, or subtract from effects of the mechanical stress. For example, mechanical pressure can be applied to the crystal tending to move the domain wall, and an electrical voltage simultaneously applied which tends to move the wall in the opposite direction. Provided that the wall is in a stable location, i.e., in a wall storage location, the voltage can readily be adjusted so that the wall will not move. If the polarity of the voltage is suddenly reversed, for example by an electronic switch, the wall will move under the combined effects of the electrical and mechanical stress. Similarly a periodic electrical field can be applied in conjunction with mechanical stress to give a periodically varying rate of wall motion. The periodic field can be produced by electrode shaping as described hereinabove, or the field can be carried by varying the voltage applied to completely electroded crystal faces as a domain wall is swept across the switching region.

Figure 14:
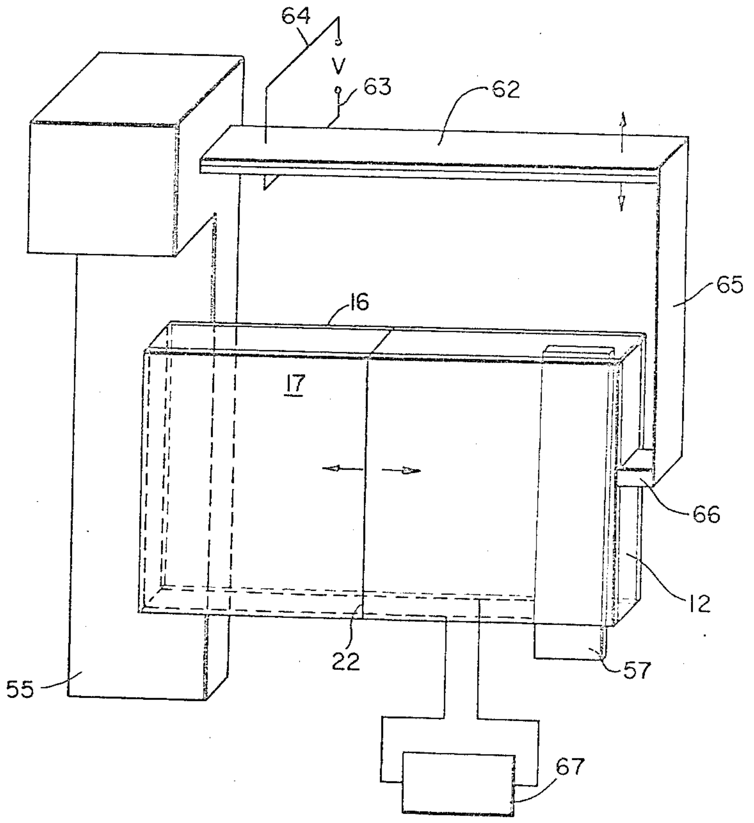
FIG. 14 is a view, in perspective, of a bistable element of this invention using mechanical stress to drive the domain wall.

FIG. 14 shows an embodiment in which mechanical stress is applied in conjunction with an electric field. A crystal such as a c-cut crystal of gadolinium molybdate 12, which is fully electroded with electrodes 16, 17 on the faces of the plate is cemented to a supporting clamp 55 and clamp 57 to define a closed switching region. The clamps are applied so that the switching region contains a single domain wall parallel to the straight edges of the clamps. The mechanical stress is supplied by a bender bimorph element 62 composed of two piezoelectric ceramic strips, which are oriented, electroded and joined together. Such devices are well known as mechanical-electrical transducers, e.g., in ceramic phonograph cartridges. On application of a voltage V across leads 63 and 64 attached to the electroded faces of the bender bimorph the element bends.

Generally, a voltage of 100–200 v. is sufficient to drive the device which is capable of high frequency response. The end of the bender bimorph 62 opposite the supporting clamp 55 is attached to a drive rod 65. The other end of rod 65 is cemented with epoxy cement to the edge of the crystal plate 12. Thus on application of a voltage V force is applied to the crystal plate directed parallel to the domain wall 22. Active or passive means 67 to control the flow of charge between electrodes 16 and 17, as described hereinabove are provided as described hereinabove.

It will be realized that by measuring the flow of charge, the position of the domain wall can be monitored.

Devices employing mechanical as well as electrical driving can be employed in all the applications suitable for devices using pure electrical drive.

Since obvious modifications and equivalents in the invention will be evident to those skilled in the art, I propose to be bound solely by the appended claims.

The embodiments of the invention in which an exclusive property or privilege is claimed are defined as follows:

1. A multistable element comprising a coupled ferroelectric/ferroelastic single crystal plate exhibiting uniaxial electric polarization, means to apply constraints to said plate to define a switching region occupying less than the total length of said plate; means to controllably move domain walls within said switching region; including electrode means on the faces of said plate intersecting the polarization axis, means to control the transfer of charge between said electrode means; and means for inhibiting the nucleation of spurious domains in said plate.

2. The multistable element of claim 1 wherein said plate is of uniform thickness cut substantially perpendicular to the axis of electric polarization.

3. The multistable element of claim 2 wherein said means to apply constraints to said crystal plate and means for inhibiting the nucleation of spurious domains comprise means for excluding the electric field generated by said electrode means from the regions of said crystal adjacent to at least three edges of said crystal.

4. The multistable element of claim 2 wherein said means to apply constraints to said crystal plate and means for inhibiting the nucleation of spurious domains comprises at least one mechanical clamp selectively positioned on the surfaces of said crystal to define a clamped zone in which deformation of the crystal is prohibited, said clamped zone extending entirely across said plate, from one edge to another, and having at least one edge parallel to said domain wall.

5. The multistable element of claim 1 wherein said crystal is a crystal having an Aizu point group representation selected from the group of point group representations consisting of 42mFmm2, $\bar{4}$F2, and 222F2.

6. The multistable element of claim 5 wherein said crystal is a crystal selected from the group of crystals belonging to the Aizu point group $\bar{4}$2mFmm2.

7. The multistable element of claim 6 wherein said crystal is a stable single crystal having the β'-gadolinium molybdate structure represented by the formula $(R_xR'_{1-x})_2O_3\cdot 3Mo_{1-e}W_eO_3$ wherein R and R' represent scandium, yttrium or at least one rare earth element having an atomic number of from 57 through 71, $x$ is from 0 to 1.0 and $e$ is from 0 to 0.2.

8. The multistable element of claim 7 wherein said crystal is a crystal selected from the group of crystals consisting of β'-$DyGd(MoO_4)_3$, β'-$Nd_{0.1}Tb_{1.9}(MoO_4)_3$, β'-$Gd_2(Mo_{0.9}W_{0.1}O_4)_3$, and those crystals represented by the formula β'-$X_2(MoO_4)_3$ wherein X is Sm, Eu, Gd or Tb.

9. The multistable element of claim 8 wherein a. said crystal is a substantially rectangular crystal cut with faces parallel to the {001} crystal planes and with at least two edges cut parallel to one <110> axis, b. said electrodes are positioned on the {001} surfaces of said crystal; and including c. means for nucleating ferroelectric/ferroelastic domains within said crystal selectively positioned to nucleate domains having domain walls parallel to one set of {110} planes in said crystal.

10. The multistable element of claim 9 wherein said means for nucleating ferroelectric/ferroelastic domains and defining a switching zone comprises a T-shaped electrode disposed on one {001} surface of said crystal with the arms of said T-shaped electrode terminating at two opposite edges of said crystal which are parallel to <110> axes; the base of said T-shaped electrode terminating at a third {110} edge of said crystal, and the cross-bar of said T-shaped electrode being displaced from the fourth edge of said crystal, whereby a stream of domain walls originating in the arms of said T-shaped electrode and moving towards the base of said T-shaped electrode can be generated by applying alternatively polarity voltage pulses to said electrodes.

11. The multistable element of claim 10 wherein said means for defining a switching zone and inhibiting the nucleation of spurious domains comprises at least one mechanical clamp positioned on the {001} surfaces of said crystal, extending across the entire crystal at the end of said crystal containing the edge removed from the cross-bar of said T-shaped electrode.

12. The multistable element of claim 9 wherein said electrode means comprise a T-shaped electrode disposed on one {001} surface of said crystal with the arms of said T-shaped electrode terminating at two opposite ends of said crystal which are parallel to <110> axes and the base and cross-bar of said T-shaped electrode being displaced from the third and fourth edges of said crystal respectively.

13. The multistable element of claim 12 wherein said electrode means further comprises a plurality of additional electrodes disposed on the {001} face of said crystal containing said T-shaped electrode, said additional electrodes being displaced from the base of said T-shaped electrode and from one another by narrow gaps with long dimensions parallel to said domain wall, said gaps defining domain wall storage locations.

14. The multistable element of claim 8 wherein a. said crystal plate is a substantially rectangular crystal plate cut with faces parallel to the {001} crystal planes and with at least two edges cut parallel to one <110> axis;

b. having a first set of electrodes on surfaces of said plate and a second electrode on the opposing face, said first set of electrodes being adapted and arranged to produce a net driving force on said domain wall which is a monotonically varying function of distance along the direction of motion of said domain wall where an electrical field is applied to said electrodes whereby the position of the domain wall can be varied by varying the applied electric potentials.

15. The multistable element of claim 14 wherein said first electrode set is a single electrode shaped so that the length of domain wall intersected by said electrode is a monotonically varying function of the distance along which the domain wall travels.

16. The multistable element of claim 14 wherein said first set of electrodes essentially cover the switching region and consists of two electrodes, one of said first set of electrodes being shaped so that the length of the domain wall intersected by the electrode is a monotonically increasing function of the distance along an axis parallel to the direction of travel of a domain wall and the other electrode of said first set is shaped complementally so that the length of the said domain wall intersecting the electrode is a monotonically decreasing function of the distance along an axis parallel to the domain wall.

17. The multistable element of claim 8 wherein said crystal plate is a substantially rectangular crystal cut with faces parallel to the {001} planes and at least two edges parallel to one <110> axis; said crystal plate having a first set of electrodes on one face and a second electrode covering the other face, said first set of electrodes comprising a rectangular electrode defining a rectangular switching region within said crystal having its edges parallel with the edges of said crystal and removed from at least two edges of said crystal, and two retrieval electrodes positions on the surface of the plate being said rectangular electrode and spaces therefrom by narrow gaps with long dimensions parallel to a domain wall, thereby defining domain wall storage locations, means to apply a voltage between said rectangular electrode and said second electrode to move a domain wall located under said rectangular electrode to a storage location, and means to apply a voltage to said retrieval electrodes wherein a domain wall is in a storage location whereby the domain wall in the storage location is moved with said rectangular electrode.

18. The multistable element of claim 8 wherein said crystal plate is a substantially rectangular crystal plate cut with faces parallel to {001} planes and at least two edges parallel to a <110> axis, said crystal plate having a first set of electrodes on one face and a second electrode on the other face, said first set of electrodes comprising at least two electrodes disposed on one face of said crystal and positioned to produce, along an axis parallel to the direction of motion of said domain wall, successive regions of high field strength, separated by narrow regions of negligible field strength, with long dimensions parallel to said domain wall, thereby defining a plurality of domain wall storage locations at the interfaces between the high and negligible field regions, whereby said domain wall can be moved incrementally from one storage location to the next by successively applying voltage between each of said electrodes and said second electrodes.

19. The multistable element of claim 18 wherein said first set of electrodes comprises two interdigitated electrodes and means for applying voltage between first one and then the other of the first set of electrodes, and said second electrode.

20. A multistable element of claim 18 wherein said crystal plate is a substantially rectangular crystal plate having faces parallel to {001} planes of said crystal and at least two edges parallel to a <110> axis, and having at least two electrodes substantially covering said faces, said crystal having a closed switching region and being divided into at least two coupled ferroelectric/ferroelastic domains by domain walls in said switching region, a first clamp and a second clamp each fixed to a face of said plate outside said switching region and extending across said plate, to define two clamped zones in which deformation of the crystal is prohibited, said clamped zones extending entirely across the crystal from an edge to the other and having linear edges adjacent to and defining said switching region parallel to said domain walls.

21. The multistable element of claim 20 wherein not more than two domains are present.

22. The multistable element of claim 20 including means to apply mechanical force to one of said clamps directed parallel to said domain wall, and means to control the transfer of charge from one face of the plate to the other.

23. The multistable element of claim 22 wherein said means to control the transfer of charge is a resistor.

24. The multistable element of claim 22 wherein said means to control the transfer of charge is a voltage source.

25. The multistable element of claim 24 wherein said voltage source is adapted and arrayed to initially apply a voltage opposing the movement of the domain wall and thereafter is switched to the opposite polarity thereby assiting the movement of the domain wall.

26. An information processing device comprising, in combination:

a plate of a coupled ferroelectric/ferroelastic single crystal, exhibiting uniaxial polarization, means to define a switching region in said plate less than the total volume of said plate, said crystal having a ferroelectric/ferroelastic domain wall in said switching region, means to move the said domain wall in said switching region in response to input signals, and means for detecting the position of said domain wall.

27. The device of claim 26 wherein said switching region is defined by two clamps fixed to said plate outside said switching region and having straight edges defining said switching region which extend across said plate and are parallel to said domain wall.

28. The device of claim 27 wherein said crystal plate has electrodes on the faces thereof and said domain wall is moved by the application of electrical input signals to said electrodes.

29. The device of claim 16 wherein said crystal is a crystal having a point group representation selected from the group of point group representations consisting of $\bar{4}2mFmm2$, $\bar{4}F2$, and 222F2.

30. The device of claim 29 wherein said crystal is a crystal selected from the group of crystals belonging to the point group $\bar{4}2mFmm2$.

31. The device of claim 30 wherein said crystal is a stable single crystal having the gadolinium molybdate structure represented by the formula $(R_xR'_{1-x})_2O_3 \cdot 3Mo_{1-e}W_eO_3$ wherein R and R' represent scandium, yttrium or at least one rare earth element having an atomic number of from 57 through 71, $x$ is from 0 to 1.0 and $e$ is from 0 to 0.2.

32. The device of claim 31 wherein said plate is an essentially rectangular plate having faces parallel to the {001} planes and having at least two edges parallel to a <110> axis.

33. The device of claim 32 wherein said switching region is defined by two clamps fixed to said plate outside said switching region and having straight edges defining said switching region which extend across said plate and are parallel to said domain wall.

34. The device of claim 33 wherein said crystal plate has electrodes on the faces thereof and said domain wall is moved by the application of electrical input signals to said electrodes.

* * * * *

UNITED STATES PATENT OFFICE
CERTIFICATE OF CORRECTION

PATENT NO. : 3,732,549

DATED : May 8, 1973

INVENTOR(S) : John R. Barkley

It is certified that error appears in the above-identified patent and that said Letters Patent are hereby corrected as shown below:

Cover page, 2 occurrences, the inventor's name should be --John R. Barkley--.

Col. 2, line 33 - "grown" should be --grow--;

Col. 3, line 30 - "sue" should be --use--;
line 61 - "wall" should be --walls--;

Col. 7, line 32 - "domains" should be --domain--;

Col. 13, line 48 - "switching" should be --switched--;

Col. 15, line 31 - "capitance" should be --capacitance--;

Col. 17, line 32 - "an" should be --can--;

Col. 18, line 17 - "interdigited" should be --interdigitated--

Col. 21, line 27, claim 1 - "," should be --;--;
line 31, claim 1 - delete ";" ;
line 67, claim 7 - "$(R_xR'_{law-x})_2$..." should be --$(R_xR'_{1-x})_2$...--;

Col. 22, line 63, claim 14 - after the semicolon, insert --and--;
line 64, claim 14 - "surfaces" should be --one face--;

Col. 23, line 36, claim 17 - "positions" should be --positioned--;
line 37, claim 17 - "being" should be --bearing--; and "spaces" should be --spaced--;
line 47, claim 17 - "wherein" should be --when--;

UNITED STATES PATENT OFFICE
CERTIFICATE OF CORRECTION

PATENT NO. : 3,732,549 PAGE 2

DATED : May 8, 1973

INVENTOR(S) : John R. Barkley

It is certified that error appears in the above-identified patent and that said Letters Patent are hereby corrected as shown below:

Col. 23, line 48, claim 17 - "is" should be --can be--;
line 49, claim 17 - "with" should be --by--;

Col. 24, line 40, claim 25 - "assiting" should be --assisting--;

Col. 25, line 4, claim 31 - the formula should be --$\cdot 3Mo_{1-e}W_eO_3$--.

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*